Figure 1:
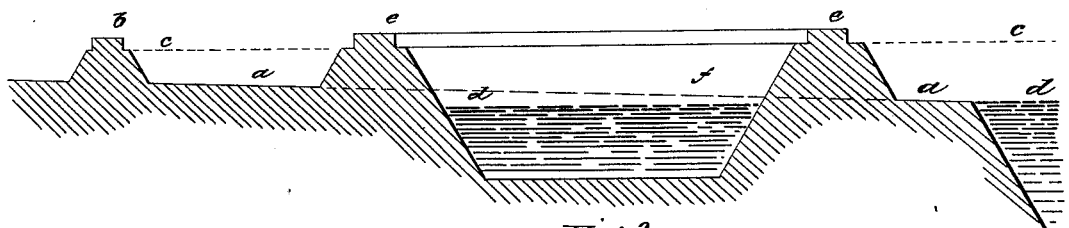
Figure 2:
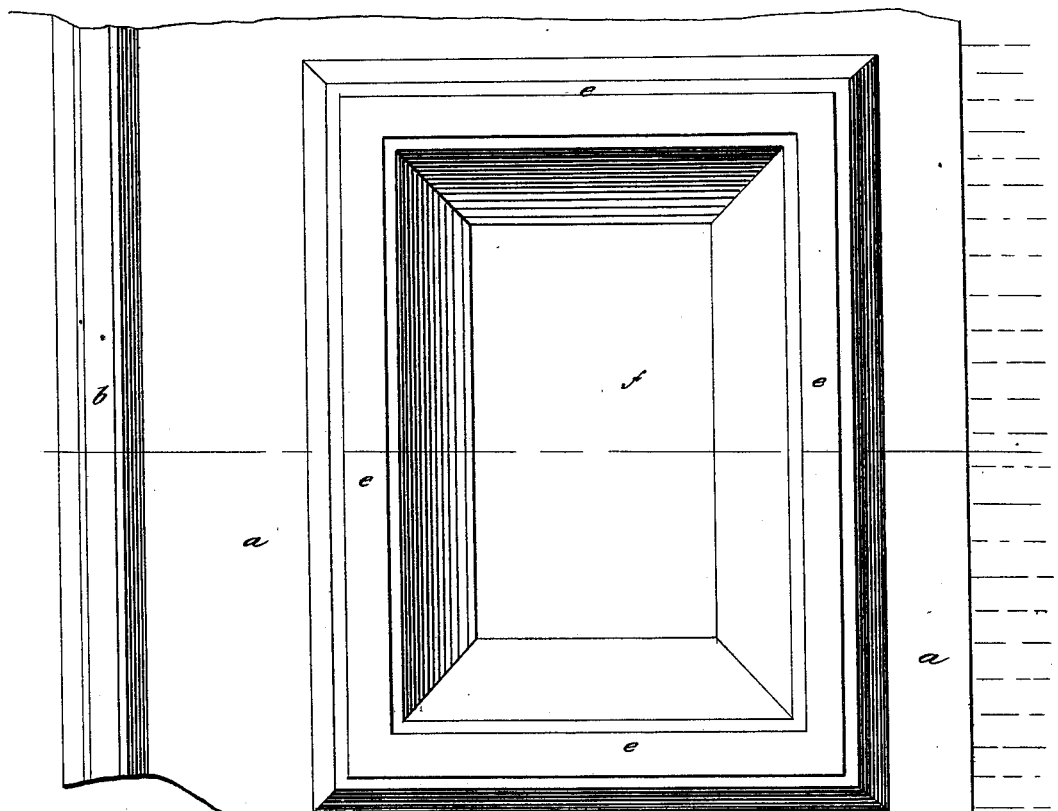

H. O. AMES.
Method of Obtaining Pure Water from Rivers.

No. 214,343. Patented April 15, 1879.

UNITED STATES PATENT OFFICE.

HUGH O. AMES, OF NEW ORLEANS, LOUISIANA.

IMPROVEMENT IN METHODS OF OBTAINING PURE WATER FROM RIVERS.

Specification forming part of Letters Patent No. 214,343, dated April 15, 1879; application filed January 2, 1879.

*To all whom it may concern:*

Be it known that I, HUGH O. AMES, of New Orleans, in the parish of Orleans and State of Louisiana, have invented an Improved Mode of Constructing Reservoirs for Filtering River-Water, of which the following is a specification.

My invention relates to improvements in the construction of reservoirs for filtering turbid waters obtained from rivers, and has been specially devised for use in obtaining water from the Mississippi River, which, at certain seasons of the year, is so charged with alluvial matters as to be unfit for drinking or other purposes until filtered.

My improvements in reservoirs for filtering water obtained from rivers consist in locating these reservoirs in the sedimentary accretions in the river-bed, in combination with levees or walls constructed of sedimentary material, which act as filtering media, as well as for excluding the turbid water from the reservoir when the river is at its highest stage or flood-level.

By reference to the accompanying drawing and the following description the invention will be understood.

At certain points along the banks of the Mississippi River, which overflows periodically, there is formed what is termed a "*batture*," consisting of sedimentary accretions, which, at flood-level, is covered by water, and is more or less wide, extending from the protection-levee to the natural banks of the river. This *batture* is represented at *a* in the drawing, *b* being the usual protection-levee. *c c* is the line of the flood or high-water level, and *d d* the line of low water, the difference in these two levels of the Mississippi at New Orleans being about fifteen feet. At suitable points in this *batture*, nearest the river-bank, I excavate a reservoir, *f*, of such depth and size below the line *d* of low-water level as to contain the desired quantity of purified water for use. On or near the margin of this reservoir I construct levees or walls *e e*, of sedimentary material, which walls act as filtering media when the river rises above the low-water line *d d*. These levees or walls *e e* are constructed of such size and strength as to resist the pressure of the water at flood-level, and of height sufficient to exclude the turbid river-water when at its highest point.

The operation of these reservoirs is as follows: At the lowest level of the river, at *d d*, these reservoirs will contain water, which will be replenished from the river when any is pumped out, the water from the river filtering upward through the bottom and laterally through the sides of the reservoir *f*. As the river rises above the line *d d* of low water to the line *c c* of high-water level, the *batture* or sedimentary accretions *a a*, which surround the walls of the reservoir *f*, will be covered with water. The filtration of the water lying over this *batture* proceeds downward until, meeting with the water which filters laterally through the sides, it is carried into the reservoir *f*. The levees or walls *e e* act in a double capacity: they exclude the turbid river-water, when at a high stage, from entering and mingling with the filtered water in the reservoir *f*, and, in combination with the reservoir, also act as filtering media, the water filtering laterally through these walls into the reservoir *f*. The sedimentary matters will be left on the sides of these levees or walls *e e* or in the river.

The location of these reservoirs *f* in the sedimentary accretions in the river-bed insures the quality of the water always remaining constantly pure and free from contamination, for none but the filtered river-water enters them, which is not the case where filtering-reservoirs are situated on the shore or beach adjacent to a river or lake, for these are liable to receive, by direct drainage or filtration, the surface-water from the rain-fall upon the land about them. This surface-drainage is apt to hold most vegetable matter in solution, and other contaminations which filter into reservoirs so located, rendering the water, to a great extent, unfit for domestic use.

I am aware that it is not new to form a pond bordering on a lake and receiving its water therefrom through an intervening beach of gravel, which acts as a filtering medium; also, that filtering-reservoirs have been constructed in the sedimentary accretions of river-beds; but

What I claim as new and of my invention is—

1. The combination, with a filtering-reservoir located in the sedimentary accretions in the river-bed, of levees or walls for excluding the turbid river-water from the filtered water in these reservoirs.

2. Levees or walls which also act as filtering media at the high stage of the river, in combination with the filtering-reservoirs located in the sedimentary accretions in the river-bed.

3. A filtering-reservoir located in the sedimentary accretions in the river-bed, with levees or walls for excluding the turbid river-water from the filtered water, which levees or walls also act as filtering media at the high-water stage of the river, all combined as an entirety, substantially as described, and for the purposes set forth.

HUGH OSWALD AMES.

Witnesses:
ANDREW HÉRO, Jr.,
FRANCIS GRAHAM.